(12) United States Patent
Poscher (10) Patent No.: US 9,319,488 B2
(45) Date of Patent: Apr. 19, 2016

(54) IP MULTIPLEXING FROM MANY IP HOSTS (75) Inventor: Jens Poscher, Niederkruechten (DE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 276 days.

(21) Appl. No.: 13/141,459

(22) PCT Filed: Dec. 22, 2008

(86) PCT No.: PCT/EP2008/068135
§ 371 (c)(1),
(2), (4) Date: Jun. 22, 2011

(87) PCT Pub. No.: WO2010/072244
PCT Pub. Date: Jul. 1, 2010

(65) Prior Publication Data
US 2011/0255541 A1 Oct. 20, 2011

(51) Int. Cl.
*H04L 12/50* (2006.01)
*H04L 29/06* (2006.01)
*H04L 12/64* (2006.01)

(52) U.S. Cl.
CPC .......... *H04L 69/04* (2013.01); *H04L 12/6418* (2013.01); *H04L 65/103* (2013.01); *H04L 69/22* (2013.01)

(58) Field of Classification Search
CPC ..... H04L 47/2441; H04L 47/41; H04L 69/16; H04L 69/22
USPC .................. 370/386, 389, 392, 401
See application file for complete search history.

(56) References Cited

U.S. PATENT DOCUMENTS

| | | | | |
|---|---|---|---|---|
| 6,463,082 B2* | 10/2002 | Bergenwall et al. | .......... | 370/535 |
| 6,804,237 B1* | 10/2004 | Luo et al. | ....... | 370/392 |
| 6,850,525 B2* | 2/2005 | Mitsumori et al. | ...... | 370/395.52 |
| 6,914,883 B2* | 7/2005 | Dharanikota | .............. | 370/230.1 |
| 7,136,377 B1* | 11/2006 | Tweedly et al. | ............... | 370/356 |
| 7,525,994 B2* | 4/2009 | Scholte | ......... | 370/474 |
| 7,586,925 B2* | 9/2009 | Smith et al. | ................... | 370/399 |
| 7,649,913 B2* | 1/2010 | Lee et al. | ...... | 370/529 |
| 7,756,125 B2* | 7/2010 | Sinicrope et al. | ............. | 370/389 |
| 7,936,705 B1* | 5/2011 | Boland | ......... | 370/260 |
| 8,089,867 B2* | 1/2012 | Belling | ......... | 370/229 |
| 8,160,063 B2* | 4/2012 | Maltz et al. | ......... | 370/389 |
| 8,284,677 B2* | 10/2012 | Kini et al. | ........ | 370/241.1 |

(Continued)

FOREIGN PATENT DOCUMENTS

| | | |
|---|---|---|
| EP | 1 063 830 A | 12/2000 |
| EP | 1 217 797 A | 6/2002 |

(Continued)

OTHER PUBLICATIONS

Sze H P et al: "A Multiplexing Scheme for H.323 Voice-Over-IP Applications" IEEE Journal on Selected Areas in Communications, IEEE Service Center, Piscataway, US, vol. 20, No. 7, Sep. 1, 2002, paragraphs [0001], [0003], [0038]; figure 2.

(Continued)

*Primary Examiner* — Brian O'Connor (57) ABSTRACT

The invention relates to a method for multiplexing data packets from different Internet Protocol (IP) hosts to one multiplexing packet before the one multiplexing packet is sent to a destination IP host. The different data packets are then demuliplexed from the one multiplexing packet and distributed to different destination IP hosts.

13 Claims, 6 Drawing Sheets

(56) References Cited

U.S. PATENT DOCUMENTS

| | | | |
|---|---|---|---|
| 8,284,678 B2* | 10/2012 | Kini et al. | 370/241.1 |
| 8,295,308 B2* | 10/2012 | Iyengar | 370/473 |
| 8,472,438 B2* | 6/2013 | Kini et al. | 370/389 |
| 8,553,692 B2* | 10/2013 | Roay | 370/392 |
| 2002/0126710 A1 | 9/2002 | Bergenwall et al. | |
| 2007/0030851 A1* | 2/2007 | Sinicrope et al. | 370/392 |
| 2009/0135809 A1* | 5/2009 | Dupuy et al. | 370/352 |
| 2009/0219939 A1* | 9/2009 | Isosaari | 370/400 |
| 2011/0158133 A1* | 6/2011 | Boland | 370/260 |
| 2011/0299443 A1* | 12/2011 | Lee et al. | 370/310 |
| 2012/0113916 A1* | 5/2012 | Belling | 370/329 |

FOREIGN PATENT DOCUMENTS

| | | |
|---|---|---|
| JP | A 2007/082007 | 3/2007 |
| JP | A 2008/236378 | 10/2008 |
| WO | WO 01/30045 A | 4/2001 |

OTHER PUBLICATIONS $3^{rd}$ Generation Partnership Project; Technical Specification Group Core Network and Terminals; Core network NB data transport and transport signaling (Release 8). 3GPP TS 29.414 v8.0.0 (Mar. 2008).

\* cited by examiner

| IP MUX MULTIPLEXING INTERVAL (S) | 0.003 | s | | | | |
|---|---|---|---|---|---|---|
| MGW/NETWORK | 20 | | | | | OPTIMUM |
| IP HOSTS/MGW | 10 | 8 | 6 | 4 | 2 | 1 |
| IP MUX STREAM LEAVING A SITE | 3,600 | 2,304 | 1,296 | 576 | 144 | 36 |
| ERLANG PER IP MUX STREAM | 2.22 | 3.47 | 6.17 | 13.89 | 55.56 | 222.22 |
| AMR PACKETS/S IN A IP MUX STREAM | 72.22 | 112.85 | 200.62 | 451.39 | 1,805.56 | 7,222.22 |
| PACKETS/0.003S INTERVAL (ROUNDED DOWN) | 1.0 | 1.0 | 6.17 | 1.0 | 5.0 | 21.0 |
| MUX GAIN (IP LAYER, NO RTP HEADER COMPR.) | -7% | -7% | -7% | -7% | 24% | 28% |
| MUX GAIN (IP LAYER, WITH RTP HEADER COMPR.) | 5% | 5% | 5% | 5% | 36% | 40% |
| GAIN (IP/MPLS/PPP LAYER, RTP H. COMPR.) | 5% | 5% | 5% | 5% | 44% | 49% |

FIG. 1

| IP MUX MULTIPLEXING INTERVAL (S) | 0.150 | S | | | | | |
|---|---|---|---|---|---|---|---|

| MGW/NETWORK | | | | | | | OPTIMUM |
|---|---|---|---|---|---|---|---|
| IP HOSTS/MGW | 20 | 10 | 8 | 6 | 4 | 2 | 1 |
| IP MUX STREAM LEAVING A SITE | 3,600 | 2,304 | 1,296 | 576 | 144 | 36 | |
| ERLANG PER IP MUX STREAM | 2.22 | 3.47 | 6.17 | 13.89 | 55.56 | 222.22 | |
| AMR PACKETS/S IN A IP MUX STREAM | 72.22 | 112.85 | 200.62 | 451.39 | 1,805.56 | 7,222.22 | |
| PACKETS/0.15S INTERVAL (ROUNDED DOWN) | 10.0 | 16.0 | 30.0 | 67.0 | 270.0 | 1,083.0 | |
| MUX GAIN (IP LAYER, NO RTP HEADER COMPR.) | 28% | 28% | 28% | 28% | 28% | 28% | |
| MUX GAIN (IP LAYER, WITH RTP HEADER COMPR.) | 40% | 40% | 40% | 40% | 40% | 40% | |
| GAIN (IP/MPLS/PPP LAYER, RTP H. COMPR.) | 49% | 49% | 49% | 49% | 49% | 49% | |

| BITS | | | | | | | | NUMBER OF OCTETS | |
|---|---|---|---|---|---|---|---|---|---|
| 7 | 6 | 5 | 4 | 3 | 2 | 1 | 0 | | |
| SOURCE IP, DEST IP, … | | | | | | | | 20/40 | IP |
| SOURCE PORT, DEST PORT =<MUX UDP PORT>,LENGTH, … | | | | | | | | 8 | UDP |
| T=0 | | MUX ID = (DESTINATION UDP PORT OF MULTIPLEXED PDU) / 2 | | | | | | 2 | MULTIPLEX HEADER |
| LENGHT INDICATOR (LI) = N | | | | | | | | 1 | |
| R | | SOURCE ID = (SOURCE UDP PORT OF MULTIPLEXED PDU) / 2 | | | | | | 2 | |
| FULL RTP PACKET | | | | | | | | N | RTP HEADER |
| | | | | | | | | | RTP NBFP PAYLOAD |
| MULTIPLEX HEADER | | | | | | | | 5 | MULTIPLEX HEADER |
| FULL RTP PACKET | | | | | | | | M | RTP HEADER |
| | | | | | | | | | RTP NBFP PAYLOAD |
| … | | | | | | | | | |

IP MULTIPLEXING FROM MANY IP HOSTS

This invention relates to a method for transmitting data packets in an IP network from a plurality of source IP hosts to a plurality of destination IP hosts, to a source multiplexer multiplexing data packets and to a destination multiplexer demultiplexing the multiplexed data packets.

BACKGROUND

Multiplexing is done on IP flow basis which is characterized by source IPs and destination IP addresses. For each IP source/IP destination $\{IP_S; IP_D\}$ flow between two IP hosts an own multiplexing stream is maintained.

Bandwidth saving is achieved by multiplexing several IP packets of an $\{IP_S; IP_D\}$ flow into one $IP_M$ multiplexing packet removing the IP headers of the inserted IP packets. As an option, the RTP (Real-Time Protocol) header may be compressed in addition.

The more packets per sampling interval is can be multiplexed, the better is the bandwidth gain and the lower is transmission cost.

Current node implementations consist of multiple IP hosts (n). Consequently, m nodes with n IP hosts each would have n×m multiplexing streams and the probability for a sufficient number of IP packets/$t_s$ decreases. One option would be to increase is until sufficient IP packets are available per $t_s$ interval for multiplexing.

For real time services like voice, facsimile and circuit switched data in telecom networks end-to-end delay is a critical parameter which has to be kept to a minimum to sustain speech quality. End-to-end delay depends on delay generated due to coding and decoding, transmission delay in the IP backbone and multiplexing sampling time $t_s$.

In order to sustain telecom grade speech quality is must be minimized. This means that $t_s$ and bandwidth demand compete and if both shall be minimized the number of IP hosts has to be minimal.

Figure 1:
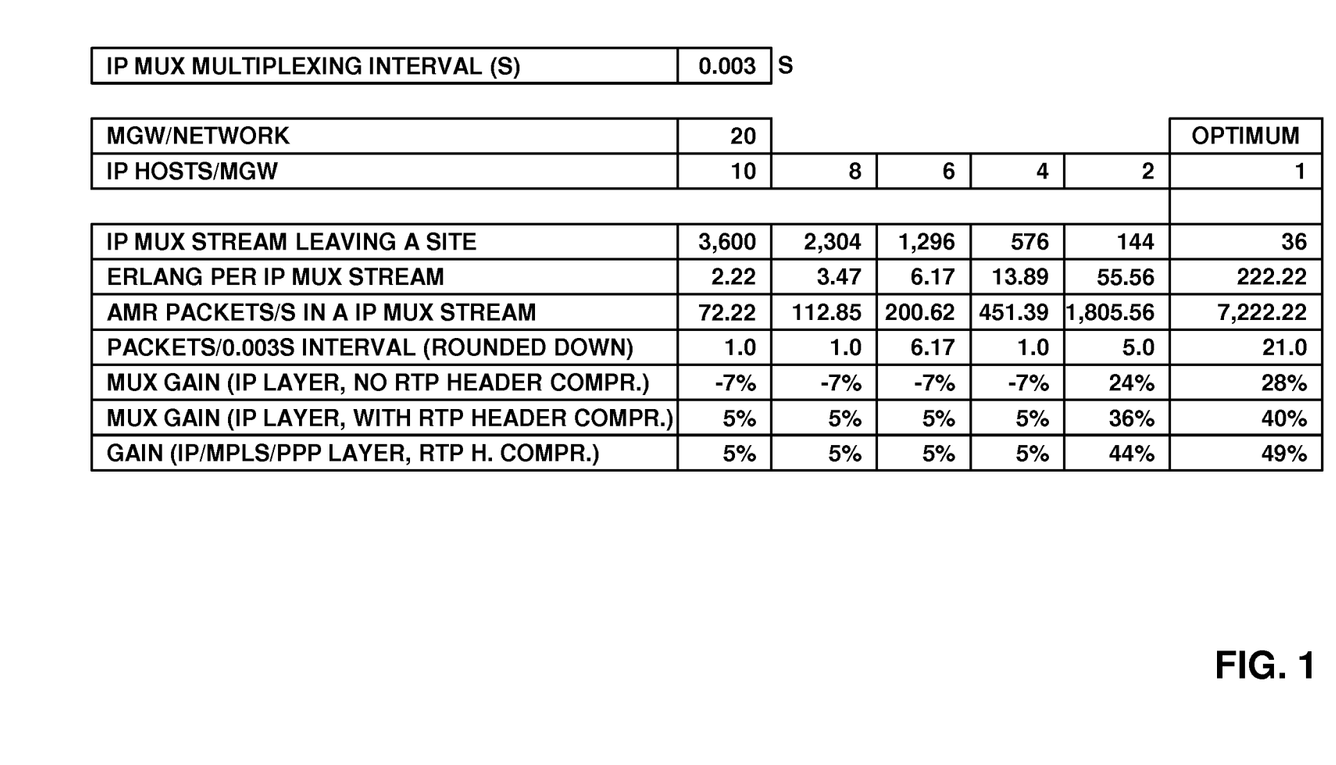
FIG. 1 shows a table showing the gain in dependence on the number of IP hosts per media gateway for a first sampling time.

In the following an IP based telecom network example is described in connection with FIGS. 1 and 2, one time with a minimized multiplexing time interval and the other time the number of IP packets being maximized. The following example bases on a network with 10 million subscribers, the network having ten sites, a site corresponding e.g. to a town. The traffic per site indicating the number of calls taking place at the same time is supposed to be 20000 Erlang. Furthermore, it is supposed that 60% of the traffic stays within the site resulting in a traffic leaving the site through an IP multiplexer of 8000 Erlang. Furthermore, two media gateways per site are used in the example, meaning that non-site local traffic leaves the site through two media gateways. In FIG. 1 a table is shown indicating the gain for a first multiplexing time interval of 0.003 ms. For real-time applications this short multiplexing interval is advantageous. In the table shown in FIG. 1 the gain is indicated depending on the fact whether a RTP (Real-Time Transport Protocol) header compression is used or not. If all media gateways have 10 IP addresses, we get 3600 MUX (multiplexer) streams from each site. Each stream handled 72.22 packets per second, which means that during the multiplexing time interval is only one packet is collected. Thus, no multiplexing gain is achieved. It is even negative without RTP header compression. From FIG. 1 it can be concluded that a media gateway should contain one or maximal two IP hosts.

Figure 2:
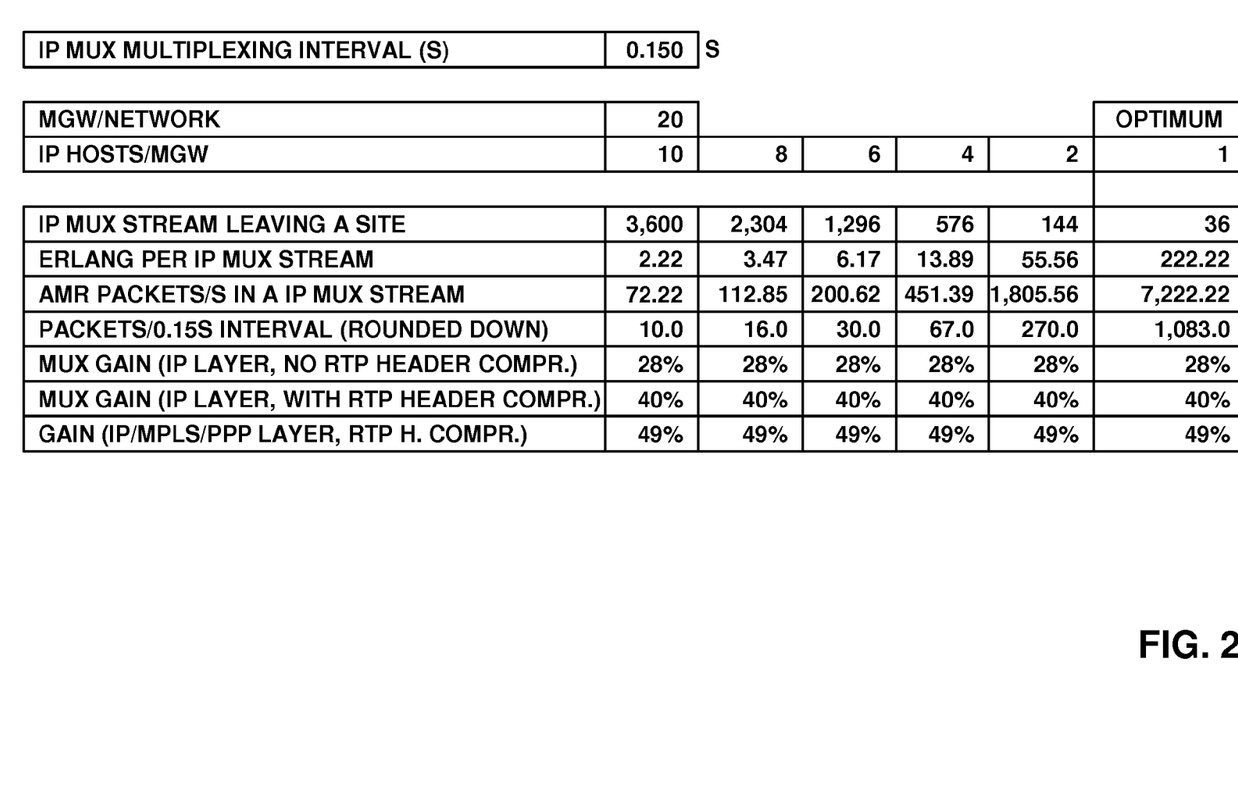
FIG. 2 shows the table of FIG. 1 for a higher increased multiplexing interval.

In FIG. 2 the same table is shown in which the multiplexing time interval is increased to 150 ms. In this case a bandwidth gain can already be obtained for 10 IP hosts per media gateway. However, the increased multiplexing time of 150 ms is normally not acceptable as delay for real-time connections. When more media gateways and more IP addresses per media gateway are used, the IP MUX stream number dramatically increases and the multiplexing gain decreases.

Accordingly, one problem can be seen in the fact that IP multiplexing is done per IP source/destination stream. In the case of many media gateways and many IP addresses per media gateway the number of IP packets which can be multiplexed in a specific time interval is very low and the proposed gain of 50% reduction of bandwidth is not reachable. On the other hand, it is not possible to increase the sampling rate for a bandwidth reduction, as the entire sampling rate is not acceptable for real-time applications, such as voice, facsimile or circuit switched data. This is applicable for mobile, wire line and radio networks.

SUMMARY

Accordingly, a need exists to obtain a bandwidth gain by multiplexing several data packets while maintaining the multiplexing sampling time low.

This need is met by the features of the independent claims. Preferred embodiments of the invention are described in the dependent claims.

According to a first aspect of the invention, a method for transmitting data packets in an IP network from a plurality of source IP hosts to a plurality of destination IP hosts is provided. According to one step of the invention, the source multiplexer collects data packets from a plurality of source IP hosts and the multiplexer multiplexes said data packets in a multiplexing packet. Furthermore, a source IP address of the source multiplexer is added to the multiplexing packet and a destination IP address of the destination multiplexer is added to the multiplexing packet. The destination multiplexer itself is again connected to a plurality of destination IP hosts. For each data packet a destination information of a destination IP host to which the respective data packet after demultiplexing is to be distributed is added to the multiplexing packet, the destination multiplexer identifying the destination IP host for each data packet on the basis of the destination information. Furthermore, the multiplexing packet is transmitted to the destination multiplexer on the basis of the destination IP address of the destination multiplexer. The collection of data packets from different source multiplexers helps to keep the number of data packets to be multiplexed high while maintaining the multiplexing sampling time $t_s$ low in order to minimize the delay and in order to allow the application of the invention to real-time applications. These IP hosts from where the different data packets originate can be in the same node or in different nodes of the IP network.

For routing the multiplexing packet the source IP address of the source multiplexer and the destination IP address of the destination multiplexer may be added to the IP header of the multiplexing packet. By way of example the multiplexing between sites may be done per class C IP sub-network. In this case additional information to be added to the multiplexing header could be the last octet of an IP address.

Furthermore, the destination information of each data packet contained in the multiplexing packet should be added. In one embodiment of the invention this can be achieved by adding the destination information of each data packet to a multiplex header contained in the multiplexing packet. However, the destination information of each packet may also be added to another part of the multiplexing packet. For further increasing the number of data packets to be multiplexed per time interval it is possible that data packets of different applications originating from different kind of interfaces are collected and are multiplexed by the source multiplexer. An example would be to multiplex data packets in a mobile communication network collecting data packets from the following interfaces: Nb, MB, IuCS and A.

For the compression of the transmitted data packets it is advantageous that the IP addresses of the destination IP hosts comprise each a common part that is common to all destination IP hosts, the IP addresses further comprising a distinguishing part that distinguishes the different destination IP hosts from each other. Preferably, the destination information only contains the distinguishing part of each destination IP address, so that the number of bits occupied for the destination IP address within the multiplexing packet is minimized. The distinguishing part of the destination IP address is preferably added to the multiplex header of the multiplexing data packet.

In an additional step it may be checked whether the destination multiplexer is able to demultiplex the multiplexing packet that was multiplexed with data packets of the different source IP hosts before the multiplexing packet is generated. If this is not the case, i.e. if the destination multiplexer cannot demultiplex the multiplexing packet, the traffic/data packets are sent unchanged.

According to another embodiment of the invention a delay and a jitter for a multiplexing packet containing data packets of different applications is kept lower than a predetermined threshold for real-time services. Preferably, the delay for sampling different data packets is kept below 50 ms, more preferably below 20 ms and even more preferably below 10 ms. Furthermore, the delay and jitter may be kept below said threshold for a specific application or node pair in the IP network.

The invention furthermore provides a method for demultiplexing a multiplexing packet that was transmitted from the source multiplexer in the IP network with a plurality of source IP hosts. As the multiplexing packet contains several data packets of different source IP hosts, the destination information contained in the multiplexing packet is extracted for each data packet contained in the multiplexing packet in order to determine to which destination IP host each data packet is to be distributed. Furthermore, each data packet is distributed to its destination IP host based on the extracted destination information.

The invention furthermore provides a source multiplexer multiplexing the data packets, the multiplexer comprising a multiplexing unit collecting data packets from several source IP hosts and configured to multiplex said data packets in a multiplexing packet. Furthermore, an IP address generating unit is provided inserting a source IP address and a destination IP address to an IP header of the multiplexing packet, the IP address generating unit furthermore adding, for each data packet, destination information of a destination IP host to which the respective data packet is to be distributed. The destination multiplexer furthermore comprises a distributor distributing each data packet to its destination IP host based on the retrieved destination information.

BRIEF DESCRIPTION OF THE DRAWINGS

The invention and further objectives and advantages thereof will best be understood by reference to the following detailed description of preferred embodiments when read in conjunction with the accompanying drawings, wherein.

DETAILED DESCRIPTION

Figure 3:
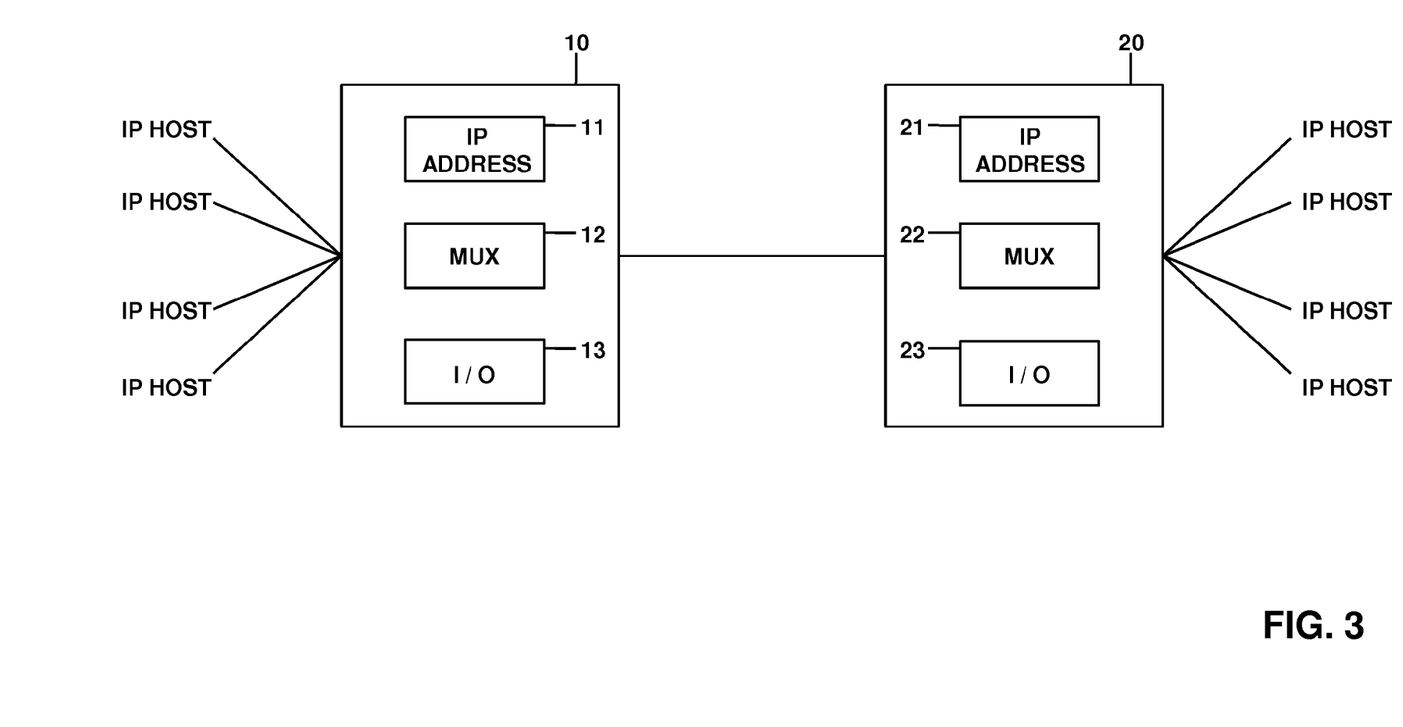
FIG. 3 shows a system with a source multiplexer and destination multiplexer allowing to multiplex and demultiplex data packets from a plurality of source IP hosts.
Figure 4:
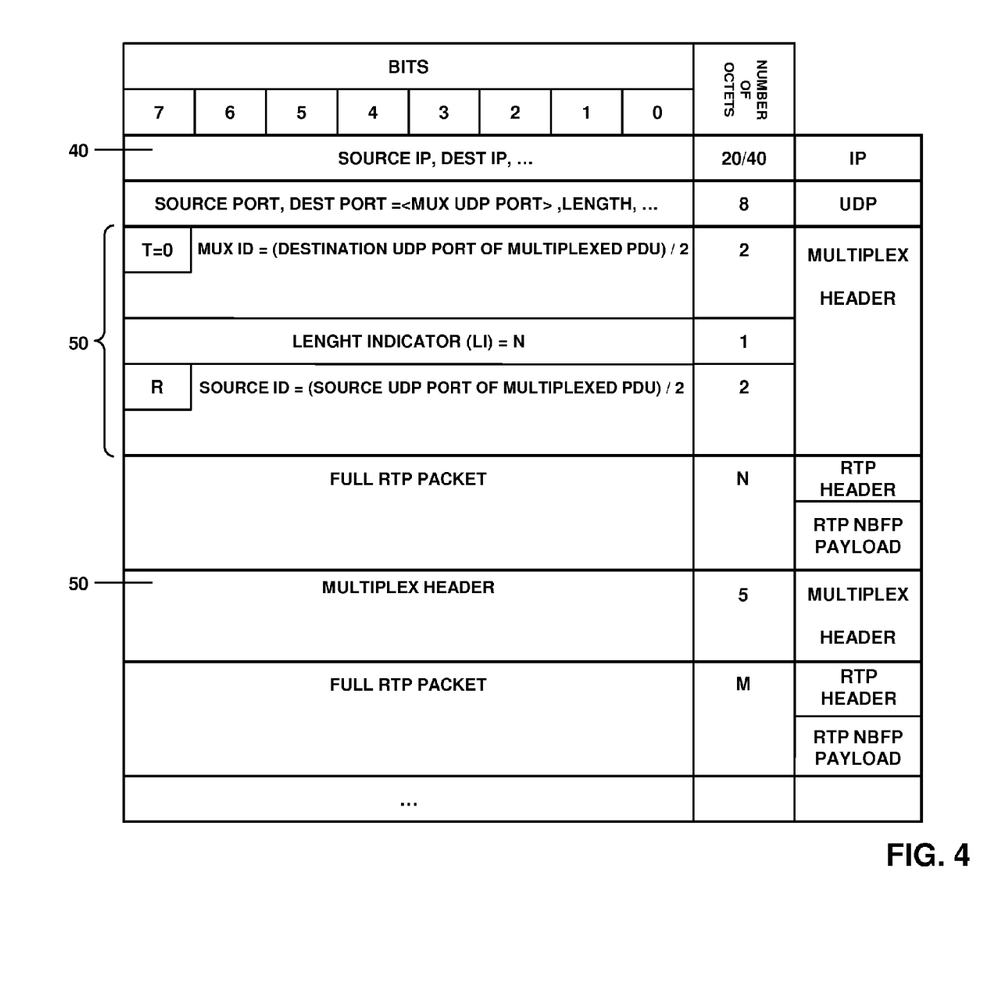
FIG. 4 shows a data structure of a multiplexing data packet.

In FIG. 3 a system is shown allowing to enhance the IP multiplexing for real-time traffic. In the system shown a multiplexer 10, the source multiplexer, multiplexes data packets of several IP hosts of a first IP network, e.g. IP network A. The multiplexer comprises a multiplexing unit 12 and an IP address generating unit 11. The IP address generating unit inserts the source IP address of the multiplexer 10 and a destination IP address of the destination multiplexer 20 to the IP header. This source and destination IP address of the source multiplexer and destination multiplexer is shown in FIG. 4 with reference numeral 40, as the IP header of a multiplexing packet is generated by the multiplexing unit 12. FIG. 4 shows the data structure of a multiplexing data packet. The IP address generating unit furthermore adds for each data packet of the different IP hosts a destination information of the destination IP host to which the respective data packet is to be distributed. This destination information can be input into the multiplex header 50 shown in FIG. 4. A transmitter 13 transmits the single-multiplexed stream containing the multiplexing packets to the destination multiplexer 20, the destination multiplexer containing an IP address extracting unit 21, a multiplexing unit 22 for demultiplexing and the distributor 23 for distributing the different data sets to the corresponding IP source depending on the extracted destination information.

Figure 5:
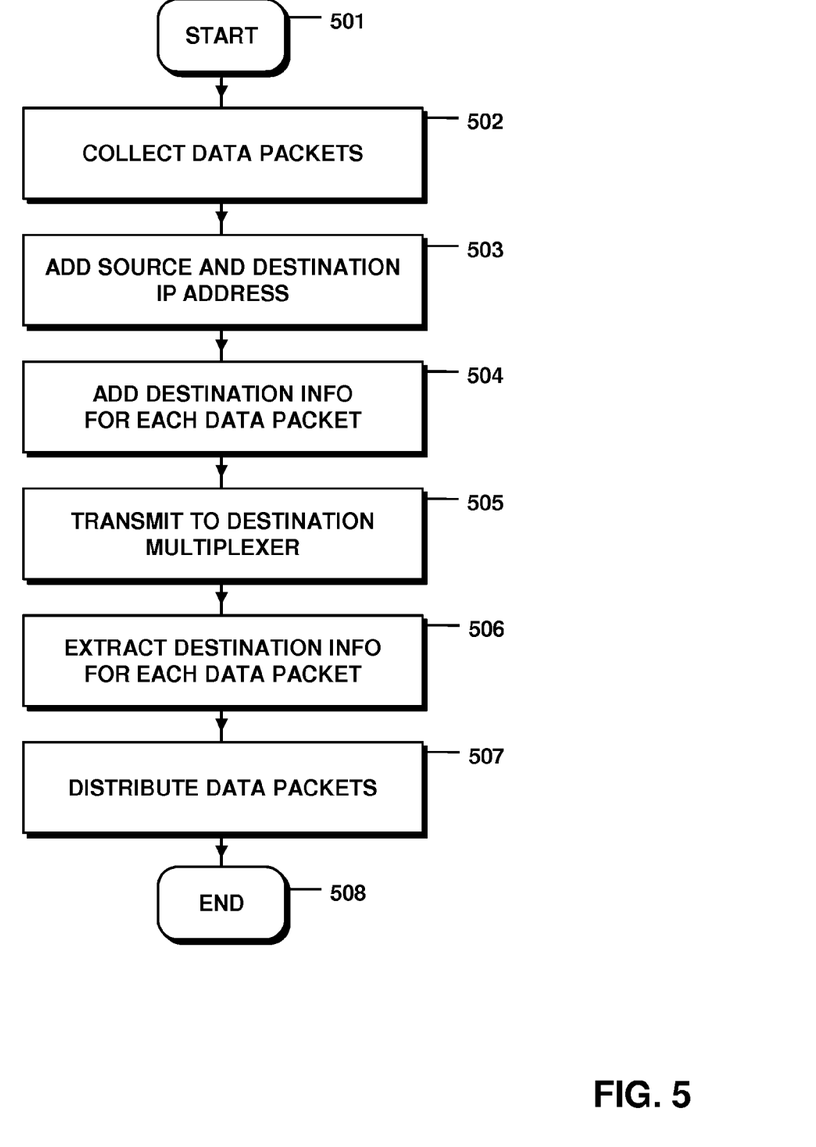
FIG. 5 shows a flowchart containing the main steps needed for multiplexing data packets from several IP hosts and for demultiplexing the data packets after transmission.

In FIG. 5 the main steps needed for multiplexing data packets of different IP hosts in one multiplexer are summarized. The method starts in step 501. In step 502 the data packets of the different IP hosts are collected during the multiplexing time interval $t_s$, is preferably being smaller than 10-20 ms. In step 503 the source IP address of the multiplexer 10 and the destination IP address of the multiplexer 20 are added to the IP header of a multiplexing data packet to be generated by the multiplexing unit 12. In an additional step 504, for each data packet contained in the multiplexing packet destination information is added to the multiplex header of each data packet. In step 505 the multiplexing data packet is transmitted to the destination multiplexer 20, where in step 506 a destination information for each data packet is extracted and each data packet is distributed to the corresponding IP host in step 507. The method ends in step 508.

In the following an example is discussed showing the advantageous effects of the present invention. A site A has one media gateway with two IP addresses A.B.C.1 and A.B.C.2 (A.B.C.0/24). The other site B has one media gateway with two IP addresses A.B.D.1 and A.B.D.2 (A.B.D.0/24).

Figure 6:
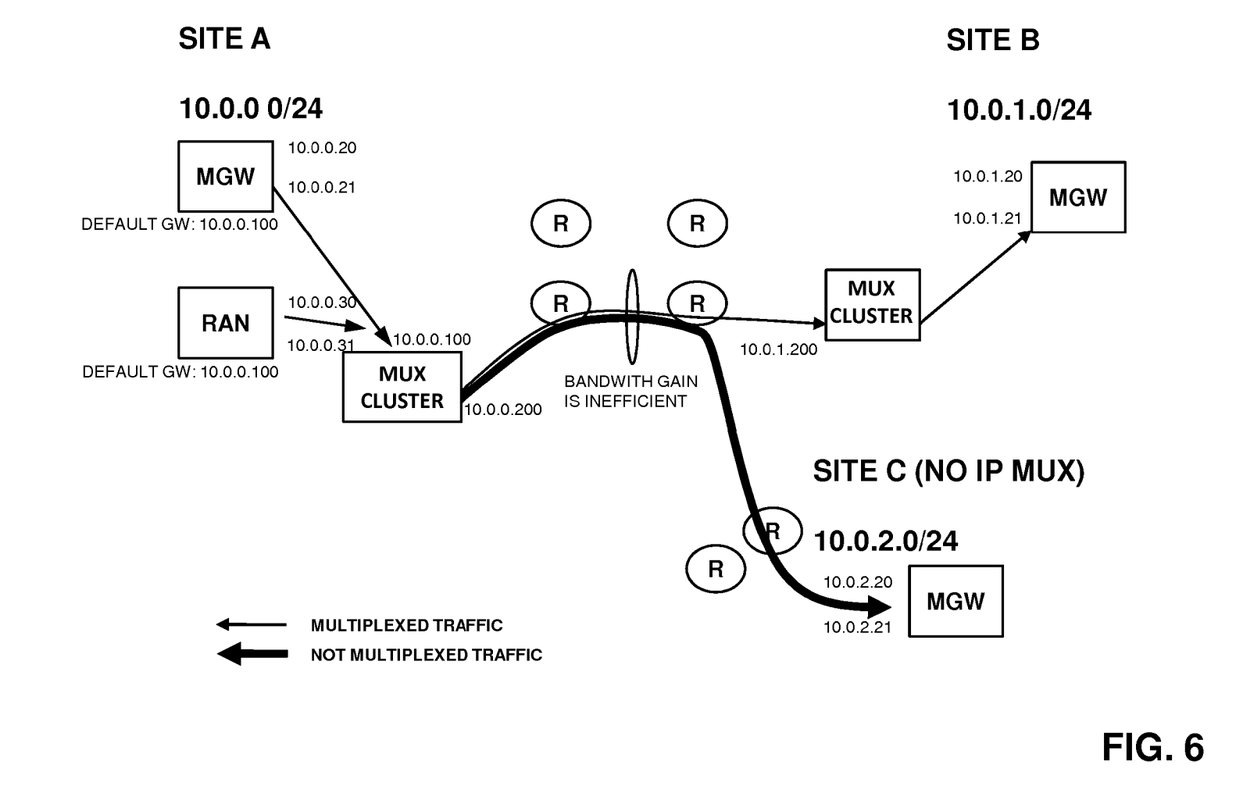
FIG. 6 shows an example of an IP network multiplexing data packets of different IP hosts.

This would correspond to four IP source/destination streams for multiplexing and can scale to 254 streams between two sites if no multiplexing from different IP hosts is used. The optimum would be one stream for multiplexing between site A and B which collects at the same time four times more IP packets to be multiplexed. In the following it is assumed that each site contains an IP multiplexer. This IP multiplexer receives data packets from an IP sub-network A (A.B.C.0/24). The IP MUX collects for a specific time is IP data packets of all local IP hosts. In FIG. 6 this example is shown in more detail with the different IP addresses of the different units. All nodes from site A, here the media gateway and the RAN (Radio Access Network) nodes send the RTP payload traffic to a default gateway IP MUX cluster with the IP address of 10.0.0.100, the media gateway having the IP addresses 10.0.0.20 and 10.0.0.21, the RAN having the IP addresses 10.0.0.30 and 10.0.0.31. The IP MUX cluster is configured in a way that it collects for the multiplexing time $t_s$ all received data packets from site A and based on the destination IP sub-network it generates a multiplexing packet $IP_M$ with its own IP address 10.0.0.200 as shown in FIG. 6, and the site B IP MUX address 10.0.1.200 as destination IP address. The IP header and the RTP header may be compressed as shown in FIG. 4 and additionally the last IP address octet (20, 21, 30 or 31) is added to the multiplex header for each multiplexed IP packet. Thus, the source IP address of each multiplexed IP packet is added to the multiplex header 50.

In each IP MUX cluster it has to be administered if the destination can demultiplex the traffic. If this is confirmed, the multiplexing packet with the data packets of different IP hosts can be sent to the MUX cluster 10.0.1.200, whereas if it is not the case the traffic is sent unchanged, e.g. to site C. The IP multiplexer of site B regenerates the correct IP headers depending on the source IP address of the received multiplexer $IP_M$ packet and the additional multiplexing header information. It can then distribute the different data packets to its destination, in the example shown to the media gateway with the IP addresses 100.1.20 and 100.1.21. The above-explained functionality can also work with the introduction of Nb, Mb, Iu/IP and A/IP and can be used for Iu, Nb and A interface at the same time.

Summarizing, the bandwidth in an IP network can be efficiently reduced by combining various RTP streams of different interfaces in the core network and radio access network keeping at the same time the multiplexing time is and with that the delay low.

The invention claimed is:

1. A method of transmitting data packets in an Internet Protocol (IP) network from a plurality of source IP hosts to a plurality of destination IP hosts, the method comprising the steps of:
   collecting, by a source multiplexer, data packets from the plurality of source IP hosts, the source multiplexer multiplexing the data packets into a multiplexing packet,
   adding a source IP address of the source multiplexer to the multiplexing packet,
   adding a destination IP address of a destination multiplexer to the multiplexing packet, the destination multiplexer being connected to the plurality of destination IP hosts,
   adding, for each data packet, a destination information including only a distinguishing part of a destination IP address for each destination IP host of the plurality of destination IP hosts, to which the respective data packet is to be distributed, to the multiplexing packet, the destination multiplexer identifying the destination IP host for each data packet on a basis of the destination information, and
   transmitting the multiplexing packet to the destination multiplexer on a basis of the destination IP address of the destination multiplexer,
      wherein the destination IP address for each destination IP host is specific to the corresponding destination IP host.

2. The method according to claim 1, wherein the source IP address of the source multiplexer and the destination IP address of the destination multiplexer are added to an IP header of the multiplexing packet.

3. The method according to claim 1, wherein the destination information of each data packet is added to a multiplex header contained in the multiplexing packet.

4. The method according to claim 1, wherein data packets of different applications originating from different kinds of interfaces are collected and multiplexed by the source multiplexer.

5. The method according to claim 1, wherein destination IP addresses of the plurality of destination IP hosts each comprise a part that is common to all of the plurality of destination IP hosts and the distinguishing part that distinguishes the plurality of destination IP hosts from each other.

6. The method according to claim 1, wherein the distinguishing part of each destination IP address is added to a multiplex header contained in the multiplexing packet.

7. The method according to claim 1, further comprising the step of checking whether the destination multiplexer is able to demultiplex the multiplexing packet containing the data packets of the plurality of source IP hosts before the multiplexing packet is generated.

8. The method according to claim 1, wherein a delay and a jitter for the multiplexing packet containing data packets of different applications is kept lower than a predetermined threshold for real-time services.

9. The method according to claim 8, wherein the delay and the jitter is kept below the predetermined threshold for a specific application or node pair in the IP network.

10. A method of demultiplexing a multiplexing packet transmitted from a source multiplexer in an Internet Protocol (IP) network with a plurality of source IP hosts, the multiplexing packet containing a plurality of data packets of different source IP hosts of the plurality of source IP hosts, the method comprising the steps of:
   extracting, by a destination multiplexer, a destination information contained in the multiplexing packet for each data packet contained in the multiplexing packet for determining to which destination IP host each data packet is to be distributed, the destination information including only a distinguishing part of a destination IP address for each destination IP host of a plurality of destination IP hosts,
   demultiplexing the multiplexing packet to separate each data packet from the plurality of data packets, and
   distributing each data packet to the destination IP host based on the destination information,
      wherein the destination IP address for each destination IP host is specific to the corresponding destination IP host.

11. A source multiplexer multiplexing data packets transmitted in an Internet Protocol (IP) network from a plurality of source IP hosts, the source multiplexer comprising:
   a multiplexing unit configured to collect data packets from the plurality of source IP hosts, and configured to multiplex the data packets into a multiplexing packet,
   an IP address generating unit configured to insert a source IP address of the source multiplexer and a destination IP address of a destination multiplexer to an IP header of the multiplexing packet, the IP address generating unit further configured to add, for each data packet, a destination information including only a distinguishing part of a destination IP address for a destination IP host of a plurality of destination IP hosts, to which the respective data packet is to be distributed, to the multiplexing packet, and a transmitter configured to transmit the multiplexing packet to the destination multiplexer on a basis of the destination IP address of the destination multiplexer.

12. The source multiplexer according to claim 11, wherein the IP address generating unit is configured to input the destination information of each data packet into corresponding multiplex headers.

13. A destination multiplexer demultiplexing a multiplexing packet transmitted from a source multiplexer in an Internet Protocol (IP) network with a plurality of source IP hosts, the multiplexing packet containing a plurality of data packets of different source IP hosts of the plurality of source IP hosts, the destination multiplexer comprising:

a destination determination unit configured to determine a destination IP host for each data packet, the destination determination unit further configured to extract a destination information contained in the multiplexing packet for each data packet contained in the multiplexing packet for determining to which destination IP host each data packet is to be distributed, the destination information including only a distinguishing part of a destination IP address for each destination IP host of a plurality of destination IP hosts, a multiplexing unit configured to demultiplex the multiplexing packet to separate each data packet from the plurality of data packets, and a distributor configured to distribute each data packet to the destination IP host based on the destination information, wherein the destination IP address for each destination IP host is specific to the corresponding destination IP host.

* * * * *